Z. DAVIS.

WICK RAISER.

No. 11,050. Reissued Dec. 24, 1889.

Witnesses

E. P. Ellis,

L. L. Burket.

Inventor:

Zebulon Davis, per

F. A. Lehmann,

Att'y.

N. PETERS, Photo-Lithographer, Washington, D. C.

UNITED STATES PATENT OFFICE.

ZEBULON DAVIS, OF CLEVELAND, OHIO.

WICK-RAISER.

SPECIFICATION forming part of Reissued Letters Patent No. 11,050, dated December 24, 1889.

Original No. 387,864, dated August 14, 1888. Application for reissue filed December 17, 1888. Serial No. 293,922.

*To all whom it may concern:*

Be it known that I, ZEBULON DAVIS, a citizen of the United States, residing at Cleveland, in the county of Cuyahoga and State of Ohio, have invented certain new and useful Improvements in Wick-Raisers, of which the following is a specification, reference being had therein to the accompanying drawings.

My invention relates to an improvement in wick-raisers; and the objects of my invention are to provide a mechanism by means of which the grip or clamp which moves the tube or sleeve to which the wick is connected will automatically move back out of contact with the tube when it is raised to a certain point, and thus allow the tube to be freely removed from position for the purpose of adjusting the wick vertically upon it or entirely renewing it; to operate the wick-raiser entirely from below, and thus avoid having the part which must be taken hold of by hand for the purpose of raising or lowering the wick from becoming heated, and to do away with the usual slot in the top of the lamp-bowl through which the oil sweats.

Figure 1:
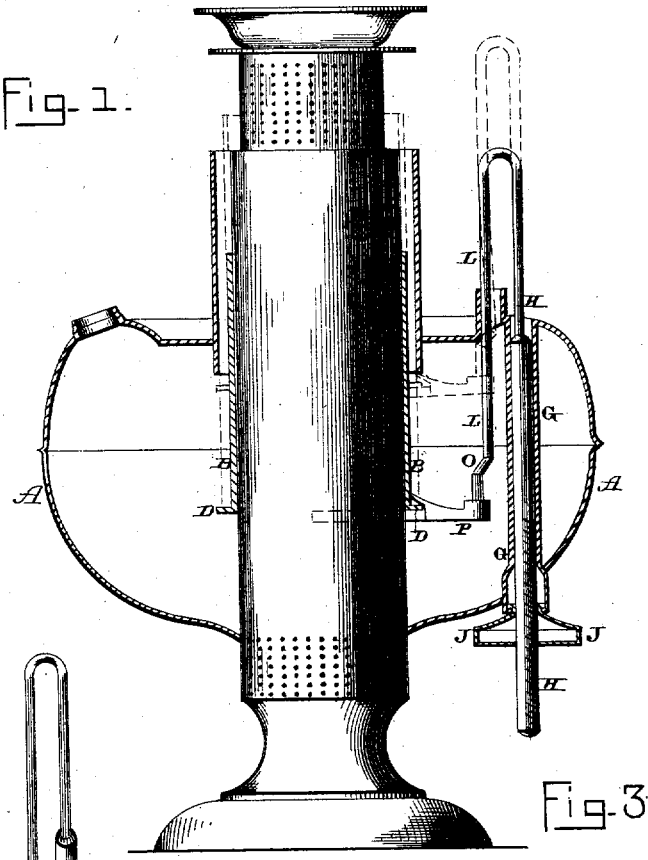
Figure 2:
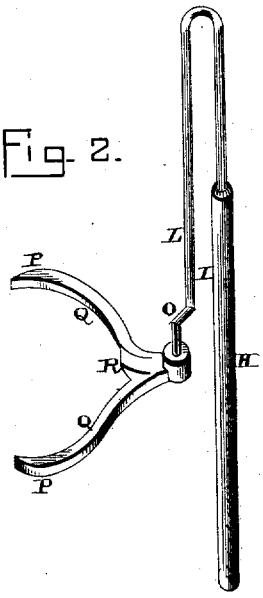
Figure 3:
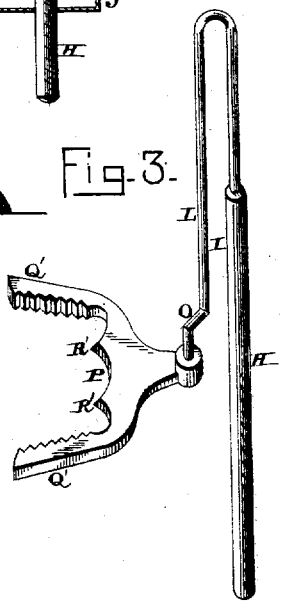

Figure 1 is a vertical section of a wick-raiser which embodies my invention. Fig. 2 is a perspective of the wick-raiser entirely detached from the lamp. Fig. 3 is a perspective showing a modification.

A represents a center-draft lamp of any desired construction. The wick is to be placed upon the vertically-moving sleeve or tube B, which is placed in direct contact with the center-draft tube, and which has a suitable flange, projection, or catch D of any kind formed upon its lower edge. The wick is fastened to this tube in the usual manner, and is raised and lowered with it.

Passing down through one side of the bowl of the lamp is the oil-tight tube G, which is open at each of its ends, and through which passes the screw-threaded portion or prong H of the wick-raiser rod I. The screw-threaded portion of this outer and longer prong passes through a thumb-nut J, which is swiveled upon the lower end of the tube in any suitable manner. By turning this thumb-nut the rod I is raised and lowered at the will of the operator, the screw-threaded portion moving vertically through the tube in the lamp-body, as shown. The inner and shorter prong L of the rod I passes down through an opening in the top of the bowl, and which is preferably made oblong. This prong and any desired length and portion of the other prong of the wick-raiser rod will be made of some elastic material, and is provided with an incline O at or near its lower end. This incline O is here shown as being located just above the top of the grip or clamp P, so that when the rod I is raised upward by the thumb-nut to a certain point this incline will come in contact with the top of the bowl, and as the vertical movement of the rod is continued this incline will force the lower end of this prong backward and outward from the tube to which the wick is secured.

Rigidly secured to the lower end of this shorter prong L is the grip or clamp P, by means of which the wick-tube is moved vertically. This grip or clamp is provided with two arms Q, which extend partially around the opposite sides of the center-draft tube, and serve both as a guide in moving the wick-tube and as a support for its lower end. When the wick-tube is inserted in position, its lower end sinks down upon these two arms Q, and it is supported by them. Projecting also from the clamp is a third and smaller arm R, which is raised upward above the arms Q sufficiently far to allow the flange or catch upon the lower end of the wick-tube to catch under it. When this clamp or grip is left free to move, it is held in contact with both the wick and the central-draft tubes; but when the rod I is raised to that point where its incline is being operated upon by the lamp-bowl and the prong L is forced backward the grip or clamp is moved backward with it sufficiently far to release the flange or catch upon the lower end of the wick-tube from the arm or projection R, and thus permit the wick-tube to be freely removed for the purpose of having the wick adjusted thereon or replaced by another. As soon as the wick-tube is returned to position it sinks downward so as to rest upon the two arms Q, and then as soon as the rod I is lowered by the thumb-screw and the incline becomes freed from the top of the bowl the elasticity of the prong L instantly forces the clamp or grip inward, so as to again engage with the wick-tube, the two arms Q catching under the flange and the one R catching above it, as shown, so as to make a rigid and positive connection therewith. As long as the incline is not acted upon by the top of the bowl, the grip or clamp retains its hold upon the lower end of the wick-tube; but as soon as the tube is raised upward by the rod I to a certain point the incline causes the grip or clamp to automatically release the tube.

In Fig. 3 is shown a different form of clamp, but in which the operation of the parts is about the same as above described. The two arms Q′ are serrated on their inner sides, so as to make positive connection with opposite sides of the wick itself and with the prongs or projections R′, which catch in the wick at any desired points in between the arms Q′. The elasticity of the prong L of the wick-raiser I forces the clamp in contact with the wick at any desired point, and thus makes positive connection therewith, so as to raise and lower it, either with or without the use of a wick-tube, as shown in Fig. 1. When the prong L is raised upward so that its incline comes in contact with the top of the bowl, the clamp is moved backward out of contact with the wick, so as to leave the wick free to be adjusted or entirely removed. The only difference between the clamp shown in Figs. 1 and 2 and the one shown in Fig. 3 is that one is intended to act in connection with a wick-tube, with which it makes a positive engagement, while the one shown in Fig. 3 makes connection with the wick itself.

I do not limit myself to the precise form of grip or clamp which is used, for this may be varied without departing from the spirit of my invention, the main point of which is to have the grip or clamp automatically disengage itself from the wick when the wick has been raised to a certain point, and thus leave the wick free to be removed and replaced.

Having thus described my invention, I claim—

1. The combination, in a wick-raiser, of the lamp-bowl having a center-draft tube with a vertically-moving rod having a spring-actuated prong, which is provided with an incline, and which passes down through an opening in the top of the bowl, and a clamp or grip which is secured to the lower end of the prong, and which makes connection with the wick or wick-tube, substantially as described.

2. The combination of the lamp-bowl provided with a center draft tube, and provided with a tube which extends down through one side of the bowl, with a vertically-moving rod provided with two prongs, one of which is made screw-threaded and to pass down through the tube in the side of the lamp-bowl, and which has its shorter prong made elastic and provided with an incline, and a grip or clamp which is secured to the lower end of the shorter prong, and which clamp, when left free to move, makes a positive connection with the wick or wick-tube, and which is automatically moved back out of contact therewith when the rod is raised to a certain point, substantially as set forth.

3. The combination of the lamp-bowl and the guiding-tube which passes down through the bowl with a wick-raiser and its operating-rod, one portion of the rod being made to pass down through the top of the lamp and connect with the wick-raiser and the other to pass down through the guiding-tube below the under side of the bowl, substantially as described.

4. The combination of the lamp-bowl provided with an opening through its top and a tube upon one side of the opening, the central-draft tube, a guiding-tube which passes down through the bowl, and a wick-raising device, with a rod for operating the wick-raiser, one portion of the rod being made to pass down through the opening in the top of the bowl and the other through the guiding-tube, substantially as specified.

In testimony whereof I affix my signature in presence of two witnesses.

ZEBULON DAVIS.

Witnesses:
F. A. LEHMANN,
E. P. ELLIS.